Nov. 11, 1952  J. L. MARKS ET AL  2,617,943
X-RAY TABLE AND CASSETTE VISUALIZING DEVICE
Filed July 19, 1950  2 SHEETS—SHEET 1

Inventors
JEROME L. MARKS
DONALD J. PEIK
By Jerald P. Welch
Attorney

Nov. 11, 1952     J. L. MARKS ET AL     2,617,943
X-RAY TABLE AND CASSETTE VISUALIZING DEVICE
Filed July 19, 1950     2 SHEETS—SHEET 2
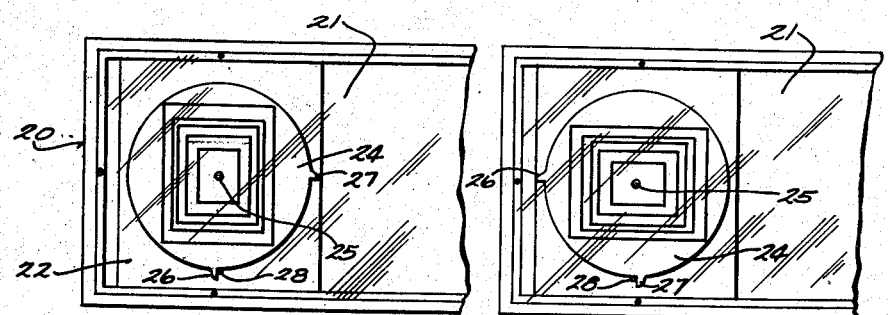
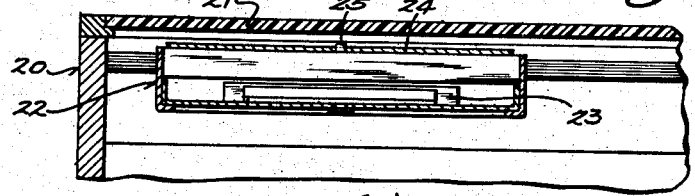
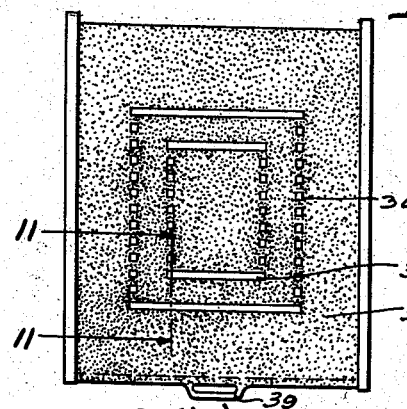 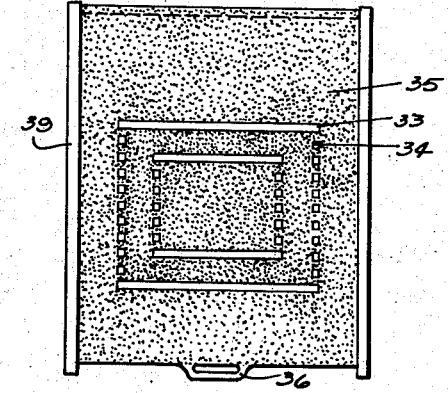
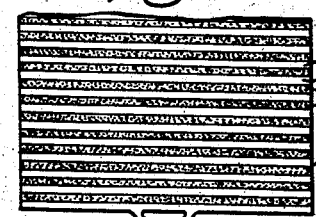 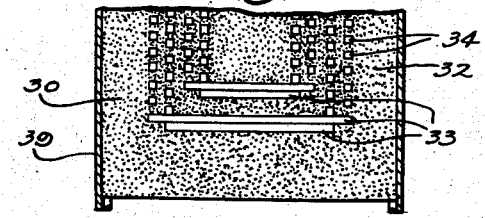
Inventors
JEROME L. MARKS
DONALD J. PEIK
Gerald P. Welch
Attorney Patented Nov. 11, 1952

2,617,943

UNITED STATES PATENT OFFICE 2,617,943

X-RAY TABLE AND CASSETTE VISUALIZING DEVICE

Jerome L. Marks, Milwaukee, and Donald J. Peik, Waukesha, Wis.

Application July 19, 1950, Serial No. 174,658

1 Claim. (Cl. 250—58)

This invention relates to improvements in X-ray tables, and more particularly to a novel X-ray table including means for visualizing X-ray cassettes for accurate centering.

An object of the invention is to provide an X-ray table having a transparent or translucent top surface whereby indicating means on a bucky mechanism may be used for accurate centering of a subject to be X-rayed on said table. In present day practice it is difficult to accurately center a subject with the result that often a film is spoiled or is lacking in value for the purposes of the X-ray operation due to the fact that the subject has been largely or materially off center.

Another object of the invention is to provide indicating means visible through the table top for reference in locating a subject of the X-ray operation.

Another object of the invention is to provide means for indicating the various sizes of rectangular film cassettes and for quickly and easily changing the direction of said rectangular reference markings from transversely to longitudinally of the table or vice versa.

Other and further objects of the invention will appear as the description proceeds, reference being had to the accompanying drawing, in which:

Fig. 4 is a fragmentary plan view of an X-ray table showing the cassette dimension marker visible through the table top.

Fig. 5 is a view similar to Fig. 4 with the indicator disposed in longitudinal relation to the table top.

Fig. 6 is a fragmentary vertical sectional view taken through the table, the bucky mechanism, and the film cassette.

Fig. 7 is a plan view of a modified form of cassette dimension indicating device.

Fig. 8 is a similar view of the same in transposed position.

Fig. 9 is a fragmentary plan view of the moveable unit of the cassette size indicating device.

Fig. 10 is a fragmentary plan view of the stationary unit of the same.

Fig. 11 is a sectional view on line 11—11 of Fig. 7.

Referring more particularly to the drawings, the numeral 10 refers to an X-ray table having a transparent top 11, which may be of sheet material of any degree of transparency, may be translucent or frosted, and may be white or of any color. It is contemplated that any one of various materials may be used, such as a transparent plastic.

Figure 1:
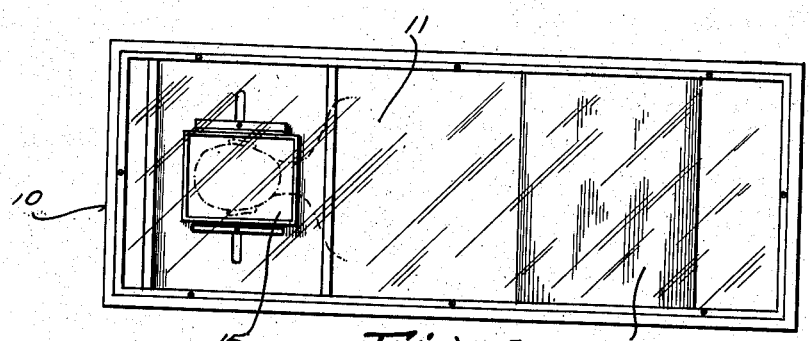
Fig. 1 is a plan view of an X-ray table embodying the invention.
Figure 2:
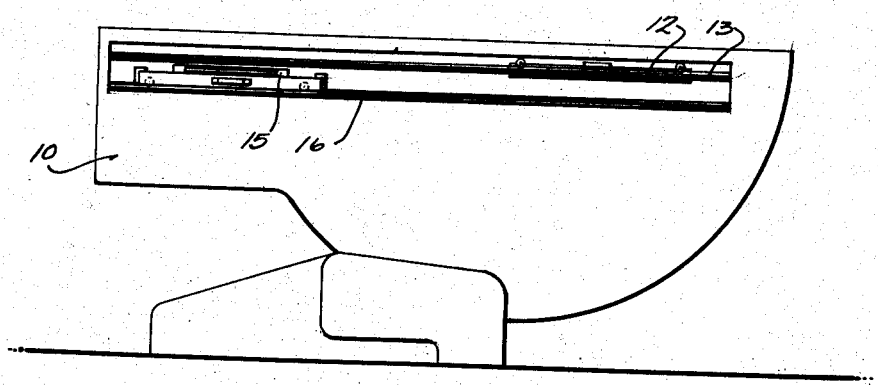
Fig. 2 is a side view in vertical section of the same.
Figure 3:
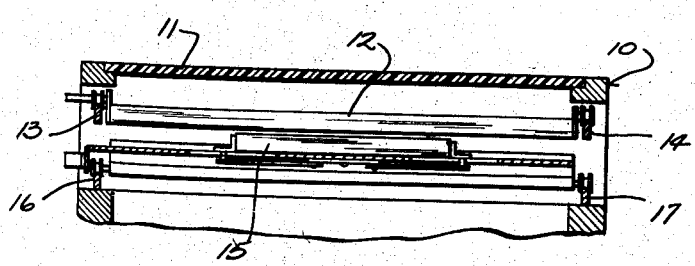
Fig. 3 is a view in transverse vertical section through the X-ray table.

In the form of the invention shown in Figs. 1 and 2, the bucky mechanism 12 is independently mounted on a pair of rails 13 and 14 disposed longitudinally under the transparent table top 11, and the film cassette 15 is spaced thereunder and movable on a second pair of rails 16 and 17. The film cassette 15 has a film centering mechanism well known to the art, so that any conventionally sized film will be properly centered with reference to the table 10. In the use of this form of the invention, the bucky mechanism may be moved out of the way while the operator centers the X-ray subject by direct reference to the film cassette as he observes it through the transparent table top 11.

In the form of the invention shown in Figs. 4, 5 and 6, an X-ray table 20, has the transparent table top 21, and a combination bucky mechanism and film carrier 22, movable longitudinally of the table 20. A film cassette 23 is held on the carrier 22, and a circular disk 24 is pivoted by means 25 centrally of the top of the unit 22. The disk 24 is provided with lateral projections 26 and 27 which impinge against a stop 28 fixed in the top of the unit 22 to limit rotation of said disk 24 in a ninety degree sweep. The disk 24 is provided on its top surface with a plurality of rectangular markings conforming to various conventional sizes of film to be used. These markings enable the operator to center the X-ray subject as they are visible through the table top 21. It will be understood that sometimes it will be desirable to dispose the film with its greatest dimension transversely of the table 20 and sometimes with said greatest dimension longitudinally thereof, and the disk 24 may be rotated to conform therewith.

In Figs. 7 to 11, inclusive, an assembly of fixed and movable sheets is adapted for attachment to the top of a bucky mechanism, not shown. A fixed sheet 30 is backed or bottomed by a white background sheet 31. The fixed sheet is opaque through the body thereof as at 32 and has a plurality of transparent stripes 33 and transparent squares 34 as wide in each dimension as the stripes 33. A movable sheet 35 provided with a handle 36 for manual movement thereof, has a plurality of alternating opaque stripes 37 and transparent stripes 38. The movable sheet 35 is limited in movement in the frame 39 to the width of a single stripe. As shown in Fig. 7, movement of the sheet 35 to one directional limit will illumine a pair of rectangular patterns having their greatest length transversely of the X-ray table, not shown, and in Fig. 8, a movement of the sheet 35 to its opposite limit will delineate a pair of rectangular patterns longitudinally of said X-ray table. The said rectangular patterns will conform to conventional film sizes in use for the work.

It will be understood that the device is capable of many modifications in structure and design, without departing from the scope of the invention, within the appended claim.

Having thus described the invention, what is claimed and desired to be secured by Letters Patent of the United States, is:

In an X-ray table, a table top having any degree of transparency, a conventional combination bucky mechanism and film cassette thereunder, a white background sheet fixed to the top of said bucky mechanism, a fixed opaque sheet having pluralities of transparent portions therein, a movable sheet, alternate opaque and transparent stripes in the latter whereby when said movable sheet is moved the width of one stripe the white background sheet will show through the fixed and movable sheets in their transparent portions to delineate rectangular cassette dimensions transversely and longitudinally of said table.

JEROME L. MARKS.
DONALD J. PEIK.

REFERENCES CITED

The following references are of record in the file of this patent:

UNITED STATES PATENTS

| Number | Name | Date |
| --- | --- | --- |
| 965,195 | Kelley | July 26, 1910 |
| 1,239,146 | Wantz | Sept. 4, 1917 |
| 1,471,081 | Waite | Oct. 16, 1923 |
| 1,628,043 | Grobe | May 10, 1927 |
| 1,967,980 | Talty | July 24, 1934 |
| 2,004,232 | Weed | June 11, 1935 |
| 2,111,903 | Rona | Mar. 22, 1938 |
| 2,115,096 | Cleary | Apr. 26, 1938 |